United States Patent

Ishihara

[11] Patent Number: 5,879,237
[45] Date of Patent: Mar. 9, 1999

[54] DEVICE FOR DAMPING ROTATIONAL FLUCTUATION AND TORSIONAL VIBRATION OF ROTARY SHAFT

[75] Inventor: Akira Ishihara, Oyama, Japan

[73] Assignee: Komatsu Ltd., Tokyo, Japan

[21] Appl. No.: 894,934

[22] PCT Filed: Mar. 6, 1996

[86] PCT No.: PCT/JP96/00547

§ 371 Date: Sep. 3, 1997

§ 102(e) Date: Sep. 3, 1997

[87] PCT Pub. No.: WO96/27747

PCT Pub. Date: Sep. 12, 1996

[30] Foreign Application Priority Data

Mar. 7, 1995 [JP] Japan .................................. 7-077444

[51] Int. Cl.$^6$ ........................................................... F16D 3/52
[52] U.S. Cl. ............................................. 464/82; 464/100
[58] Field of Search ................................. 464/51, 74, 81, 464/82, 84, 100, 160

[56] References Cited

U.S. PATENT DOCUMENTS

| | | | |
|---|---|---|---|
| 1,328,366 | 1/1920 | Brown | 464/82 |
| 1,451,576 | 4/1923 | Houston | 464/82 |
| 1,475,902 | 11/1923 | Thompson | 464/82 |
| 1,595,763 | 8/1926 | Eaton | 464/82 |
| 1,602,298 | 10/1926 | Bethel | 464/82 |
| 2,041,218 | 5/1936 | Taylor | 464/82 |
| 4,464,822 | 8/1984 | Pfiefer . | |

FOREIGN PATENT DOCUMENTS

| | | | |
|---|---|---|---|
| 12610 | 11/1933 | Australia | 464/82 |
| 37-16625 | 7/1962 | Japan . | |
| 45-19859 | 7/1970 | Japan . | |
| 55-66242 | 5/1980 | Japan . | |
| 58-72748 | 4/1983 | Japan . | |
| 61-123242 | 8/1986 | Japan . | |
| 62-24149 | 2/1987 | Japan . | |
| 62-194050 | 8/1987 | Japan . | |
| 3-36546 | 4/1991 | Japan . | |
| 4-24206 | 6/1992 | Japan . | |
| 5-047420 | 6/1993 | Japan . | |
| 459909 | 10/1937 | United Kingdom | 464/82 |
| 2186663 | 8/1987 | United Kingdom . | |

*Primary Examiner*—Eileen Dunn Lillis
*Attorney, Agent, or Firm*—Sidney & Austin

[57] ABSTRACT

A device for damping rotational variation and torsional vibrations of the rotating shaft of an engine or a transmission having gears subjected to such vibrations, thereby reducing noise, includes a rotating shaft (2), supported by a bearing; a gear (3), attached to the rotating shaft; a damper against rotational variations and torsional vibrations of the gear; a damper case (11), having a ring-like inertia governor chamber (12), attached to the gear (3); an inertia governor (13), housed in the chamber; a plurality of leaf springs (14), inserted into a groove (11a) of the damper case (11) at one end and a groove (13a) of the inertia governor (13) at the other end in such a manner as to become parallel with an axis of the rotating shaft (2); and a plurality of pads (15), inserted between the inertia governor (13) and the damper case (11).

20 Claims, 7 Drawing Sheets

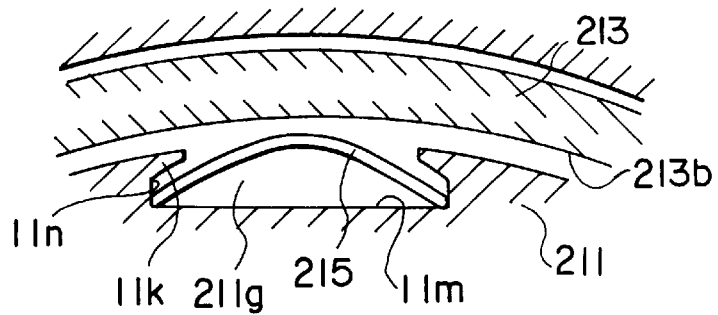
F I G. 8
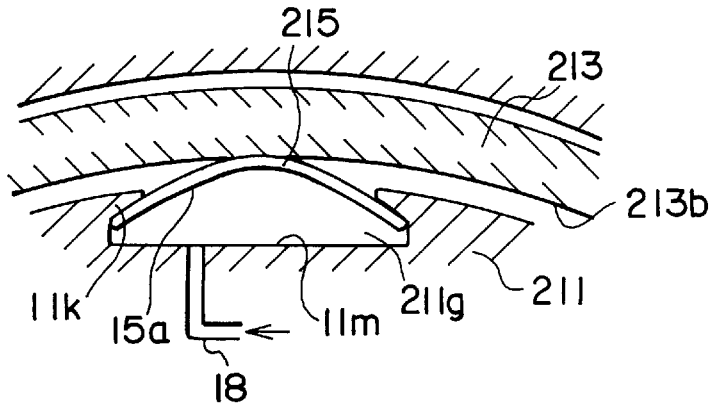
F I G. 9
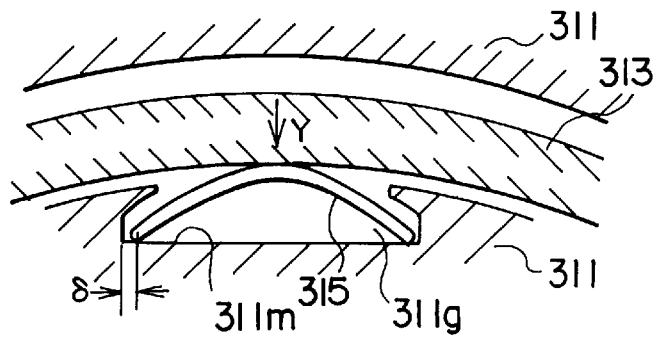
F I G. 10
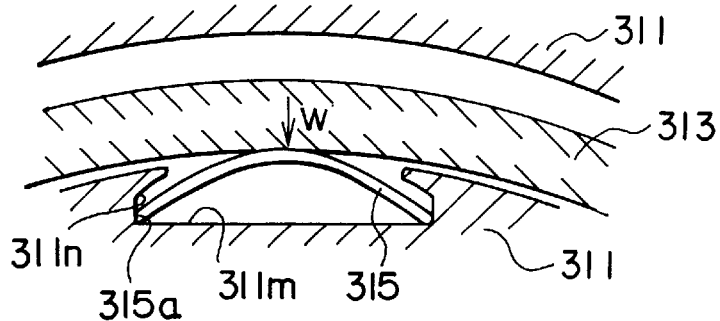
F I G. 11

DEVICE FOR DAMPING ROTATIONAL FLUCTUATION AND TORSIONAL VIBRATION OF ROTARY SHAFT

FIELD OF THE INVENTION

The present invention generally relates to a device for damping the rotational fluctuations and torsional vibrations of a rotary shaft and, more particularly, to a device for damping the rotational fluctuations and torsional vibrations of a rotary shaft used in an engine, a transmission, etc., having gears that involve rotational fluctuation and torsional vibration (the device hereafter being referred to as a damping device).

BACKGROUND ART

Conventionally, when a rotary shaft of an engine is linked to the crank shaft of the engine, a driving torque to be transmitted by the rotary shaft has a component that fluctuates, due to effects such as a combustion-expansion cycle. Consequently, the fluctuating frequency of this component rotationally vibrates gears for a fuel injection pump or gears for driving accessories such as a cooling pump, causing vibration or noise.

If a load to be driven fluctuates, as with a fuel injection pump for example, the driving torque of the rotary shaft also fluctuates, causing the driving gear attached to the rotary shaft to generate vibration or noise. Recently, the pressure of fuel injection pumps has been raised higher and higher to provide a countermeasure against exhaust emission, thereby increasing the driving torque. This, however, increases the fluctuating frequency synchronized with the fuel injection cycle, resulting in increased vibration or noise of the gears for directly driving the fuel injection pump.

For an improvement associated with the above-mentioned problem, a technology disclosed in Japanese Utility Model Laid-open No. 5-047420 was proposed. In this technology, as shown in FIG. 15, a cam shaft 52 of a fuel injection pump 51 is divided into an input section 52a and a driving section 52b. The input section 52a and the driving section 52b are coupled to each other through a damper coupling 50 composed of an inertia governor 53, a spring 54, and a damper 55. In this construction, a moment of inertia of the inertia governor 53, a spring constant of the spring 54, and a damping value of the damper 55 are appropriately selected to set a characteristic value of the damper coupling 50 to a frequency lower than a vibromotive frequency range provided by the injecting action of the fuel injection pump 51.

However, in the above-mentioned construction, coupling the input section 52a to the driving section 52b through the damper coupling 50 presents a problem of increasing the length of the cam shaft 52, thereby increasing the external size of the damper coupling in its entirety. Another problem is that, since the damper coupling 50 cannot be mounted directly on a gear of the gearing, the vibration of the gear cannot be damped. Still another problem is that, since the damper coupling 50 transmits a driving force between the input section 52a and the driving section 52b by the large power of the spring 54, the size of the spring 54 becomes large, thereby increasing the size of the damper coupling.

Further, since a vane and a rotor are pivotally inserted in a cam ring of the damper coupling 50 for rotation, the structure of the damper coupling becomes complicated and requires precision work, increasing the fabrication cost.

SUMMARY OF THE INVENTION

It is therefore an object of the present invention to overcome the above-mentioned problems by providing a device for damping the rotational fluctuation and torsional vibration of a rotary shaft of an engine, a transmission, etc., having a gear subjected to rotational fluctuation and torsional vibration.

In carrying out the invention, according to one aspect thereof, in a damping device having a rotary shaft supported by a bearing, a gear attached to the above-mentioned rotary shaft, and a damper for damping rotational fluctuation and torsional vibration of the above-mentioned gear, the above-mentioned damping device comprises: a damper case, having a ring-shaped space and attached to the above-mentioned gear; a inertia governor accommodated in the above-mentioned space; a plurality of leaf springs, each inserted at one end thereof in a groove of the above-mentioned damper case and at the other end in a groove of the above-mentioned inertia governor, the insertion being made in parallel to the axis of the above-mentioned rotary shaft; and a plurality of pads, inserted between the inner periphery of the above-mentioned inertia governor and the outer periphery of the above-mentioned damper case.

In carrying out the invention, according to another aspect thereof, each of the above-mentioned plurality of pads is each inserted in a groove of the above-mentioned damper case to abut the above-mentioned inertia governor when the above-mentioned gear and the above-mentioned rotary shaft rotate, applying a damping force to the above-mentioned inertia governor.

In carrying out the invention, according to still another aspect thereof, at least one of the above-mentioned groove of the above-mentioned damper case and the above-mentioned groove of the above-mentioned inertia governor is formed with a tapered section adapted to abut each of the above-mentioned plurality of leaf springs.

In carrying out the invention, according to yet another aspect thereof, a cooling liquid is stored or supplied in an inertia governor chamber which is a ring-shaped space in the above-mentioned damper case.

In carrying out the invention, according to a further aspect thereof, a plurality of damping devices are arranged in the above-mentioned damper case in the radial direction of the above-mentioned rotary shaft.

In the above-mentioned novel constitution, the damping device is attached to the gear and, if the rotation of the gear is slowed by the rotational fluctuation or torsional vibration of the gear, the revolving speed of the gear is increased by the inertia governor or, if the rotation of the gear is hastened, the revolving speed of the gear is decreased. Thus, the damping device according to the invention provides a so-called dynamic damper that dampens the rotational fluctuation or torsional vibration to reduce noise.

The degree of damping the rotational fluctuation or torsional vibration is adjusted by appropriately selecting the thickness and the width of the leaf springs, namely the rigidity thereof. This rigidity can also be easily adjusted by appropriately selecting the tapered section of the groove in which each leaf spring is inserted.

When a relative motion occurs between the inertia governor and the damper case, the plurality of pads apply to the inertia governor a damping force due to the frictional force of the contact surfaces to which these pads abut, thereby damping the vibration of the gear.

The heat generated by the friction between the pads and the inertia governor is cooled by the cooling liquid stored or supplied in the inertia governor chamber.

Arranging a plurality of damping devices in the damper case allows further reduction in the torsional vibration, in turn reducing the noises.

BRIEF DESCRIPTION OF THE DRAWINGS

FIG. 8 is a diagram illustrating details of an alternative pad configuration in the first embodiment of the invention, in which the pad is separated away from the inertia governor when a gear and a rotary shaft are in stopped state;

FIG. 9 is a diagram illustrating the pad pushed out from the state of FIG. 8 by the centrifugal force caused by rotation when the gear and the rotary shaft are in rotating state;

FIG. 10 is a diagram illustrating details of another alternative pad configuration for the first embodiment of the invention, showing a state of the pad when the inertia governor is positioned slightly low;

FIG. 11 is a diagram illustrating a state of the pad when the inertia governor is positioned lower than the position of FIG. 10;

BEST MODE FOR CARRYING OUT THE INVENTION

In what follows, a damping device practiced as a first embodiment of the present invention will be described in detail with reference to FIGS. 1 and 2.

Figure 1:
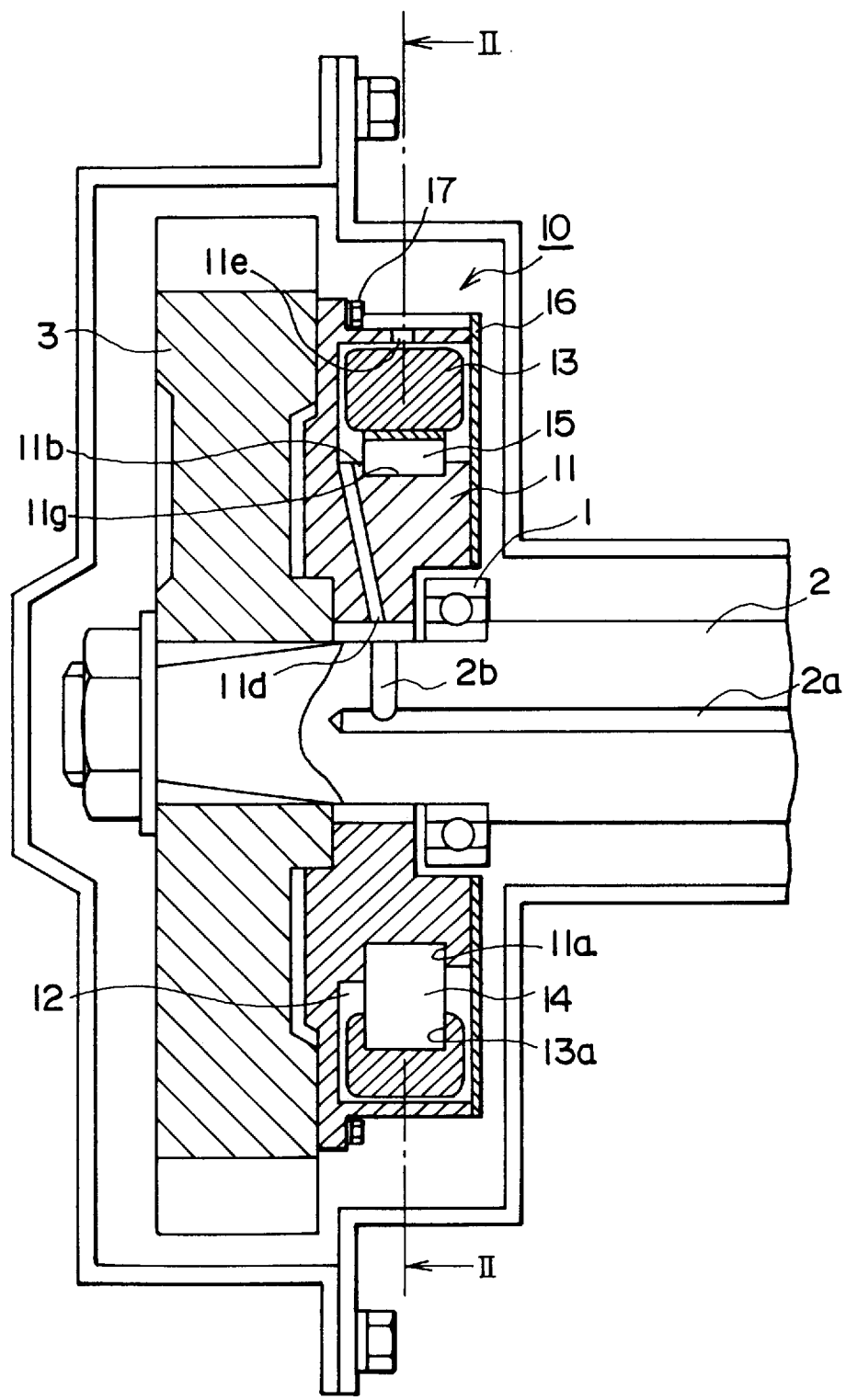
FIG. 1 is a side cross section, along line I—I of FIG. 2, illustrating the damping device practiced as a first embodiment of the invention.
Figure 2:
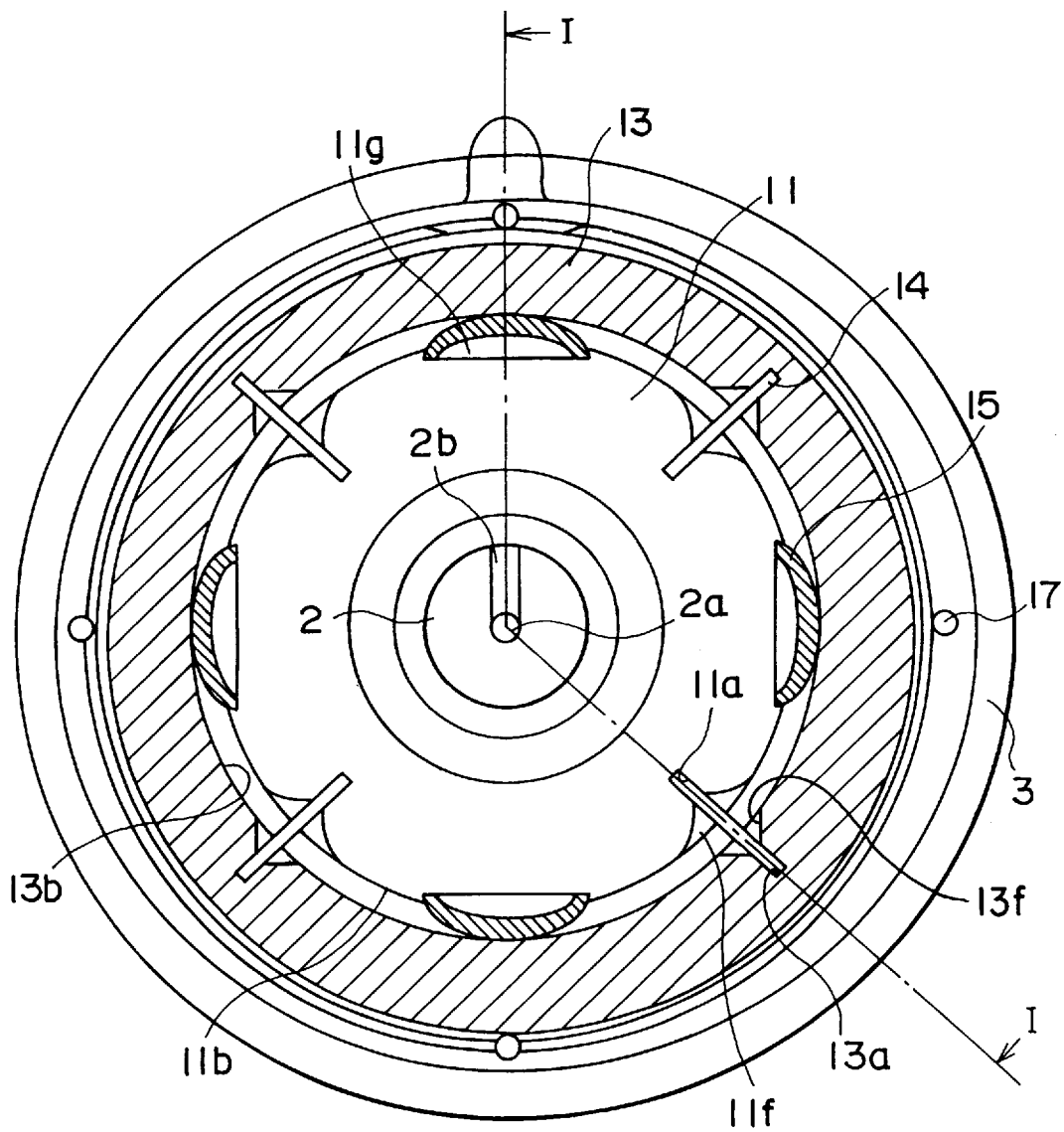
FIG. 2 is a front cross section, along line II—II of FIG. 1, illustrating the damping device practiced as the first embodiment of the invention.

Now, referring to FIG. 1, a rotary shaft 2, supported by a bearing 1; a gear 3, fixed to the rotary shaft 2; and a damping device 10 for damping rotary shaft rotational fluctuation and torsional vibration, for damping the rotational fluctuation and torsional vibration of the gear 3 as a damper, are provided. The damping device comprises a damper case 11, attached to the gear 3; an inertia governor 13, shaped like a ring and housed in an inertia governor chamber 12, which is a ring-shaped space of the damper case 11; a plurality of leaf springs 14, inserted at one end in a leaf spring groove 11a of the damper case 11 and at other end in a leaf spring groove 13a of the inertia governor 13; and a plurality of pads 15, inserted between an inner periphery 13b of the inertia governor 13 and an outer periphery 11b of the damper case 11 to support the inertia governor 13.

To be more specific, the inertia governor chamber 12, with a lid 16, is formed in an opening of the damper case 11 having a cross section generally shaped like a square bracket. The inertia governor 13 is housed in the inertia governor chamber 12. The outer periphery 11b on the inner diameter side of the damper case 11 is formed with leaf spring grooves 11a in which the plurality of leaf springs 14 are inserted, the leaf spring grooves being arranged equidistantly to each other and in parallel to the axis of the rotary shaft 2. The damper case 11 is formed on the inner diameter side with a cooling liquid inlet hole lid through which cooling oil is supplied and on the outer diameter side with a cooling liquid outlet hole 11e. The damper case 11 is fixed to the gear 3 with a bolt 17.

The leaf spring groove 11a is formed with a tapered section 11f to which the leaf spring abuts when the same deforms, details of which will be described later. The damper case is formed on the outer periphery 11b on the inner diameter side with pad grooves 11g in which the plurality of pads are inserted.

In the present embodiment, the opening in the damper case 11, having a cross section generally shaped like a rectangular bracket, is covered with the lid 16 to form the inertia governor chamber 12. Instead of using the lid 16, the inertia governor chamber 12 can be formed by loading the damper case 11 on the side opposite to the side shown in FIG. 1 by using a side surface of the gear 3.

The inner periphery 13b of the inertia governor 13 is formed with the leaf spring grooves 13a in which the plurality of leaf springs are inserted, the leaf spring grooves being arranged equidistantly to each other and in parallel to the axis of the rotary shaft 2. The inertia governor 13 is formed with a tapered section 13f to which the leaf spring 14 abuts when the same deforms, details of which will be described later. The inner periphery 13b abuts the plurality of pads 15, through which the inertia governor 13 is supported by the damper case 11.

The plurality of leaf springs 14 are inserted at one end thereof in the leaf spring groove 11a of the damper case 11 and at the other end in the leaf spring groove 13a of the inertia governor 13 equidistantly to each other and in parallel to the axis of the rotary shaft 2.

The plurality of pads 15, each having a cross section generally shaped like an arch, are inserted between the inertia governor 13 and the damper case 11; to be more specific, between the pad grooves 11g. Each of the pad grooves 11g has a cross section of which the bottom is linear, and the ends are generally shaped as two straight lines closing upwardly toward each other and are arranged in parallel to the axis of the rotary shaft 2.

The pads 15 are made of Teflon® polytetrafluoroethylene, oil impregnated metal, or synthetic resin. The leaf springs 14 can be coated with a lubricating material such as Teflon polytetrafluoroethylene.

The rotary shaft 2 is formed with holes 2a and 2b through which a cooling liquid, for example oil or water, passes, these holes communicating with the cooling liquid inlet hole 11d of the damper case 11.

The following describes the general operation of the above-mentioned constitution.

When the rotary shaft 2 is coupled to the crank shaft of an engine, not shown, and the drive torque of the rotary shaft fluctuates due to effects such as a combustion-expansion cycle, the fluctuation is damped by the damping device 10 mounted on the gear 3. When the engine accelerates at the expansion stroke, the revolving speed ωg of the gear tends to increase while the acceleration is decreased by a negative inertial force of the revolving speed ωd of the inertia governor 13 applied via the leaf spring 14. Conversely, when the engine decelerates at the compression stroke, the revolving speed ωg of the gear tends to decrease but at a smaller ratio due to a positive inertial force of the revolving speed ωd of the inertia governor applied through the leaf spring 14. Consequently, the fluctuating frequency of the driving torque rotationally vibrates, less than before, the gear for a fuel injection pump or the gear for accessories such as a cooling pump, accordingly causing less vibration or noise.

Figure 3:
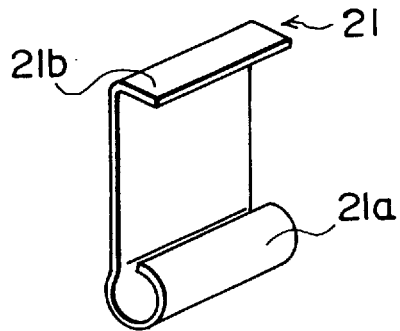
FIG. 3 is an external perspective view illustrating details of an alternative leaf spring in the first embodiment of the invention.
Figure 4:
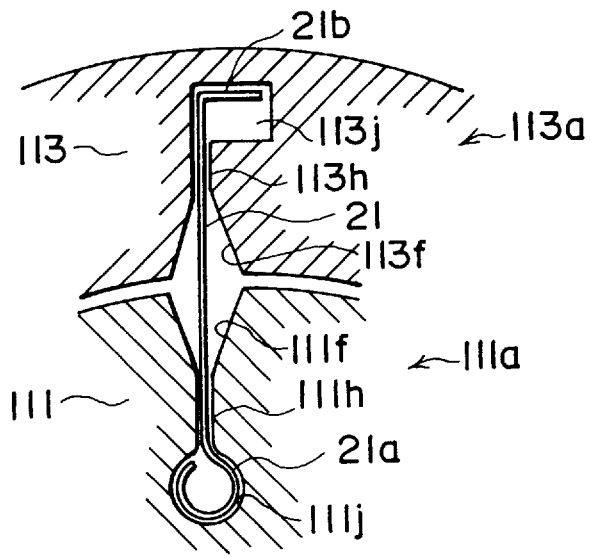
FIG. 4 is a side cross section illustrating the leaf spring of FIG. 3 as loaded in the groove of an inertia governor and the groove of a damper case.

The following describes details of a specific version of the leaf spring with reference to FIGS. 3 and 4. Many elements which are in common with the apparatus of FIGS. 1–2 are designated with the same reference numbers increased by 100.

Referring to FIG. 3, a leaf spring 21 is formed into a cylindrically shaped section 21a at one end, to be inserted in the damper case 11, and into a bent section 21b at the other end, to be inserted in the inertia governor 13, the bent section being bent to generally 90 degrees.

Referring to FIG. 4, the leaf spring groove 111a of the damper case 111 is composed of the tapered section 111f to which the leaf spring 21 abuts gradually from the outer periphery side when the leaf spring 21 is deformed, a parallel groove 111h for supporting the leaf spring 21, the parallel groove 111h having a predetermined clearance wider than the thickness of the leaf spring 21, and a cylindrically shaped section 111j for accommodating the cylindrically shaped section 21a of the leaf spring 21.

The leaf spring groove 113a of the inertia governor 113 is composed of the tapered section 113f to which the leaf spring 21 abuts gradually from the inner periphery side when the leaf spring 21 is deformed, the parallel groove 113h for supporting the leaf spring 21, the parallel groove 113h having a predetermined clearance wider than the thickness of the leaf spring 21, and a rectangularly shaped section 113j for accommodating the bent section 21b of the leaf spring 21.

Figure 5:
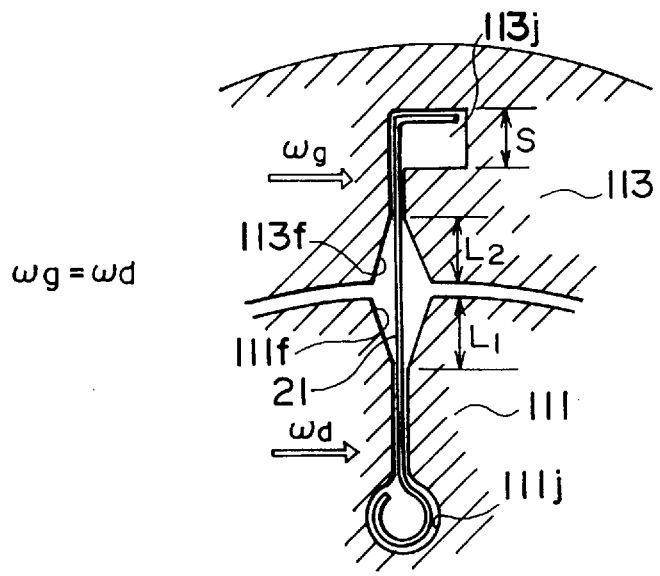
FIG. 5 is a diagram illustrating the form of the leaf spring when the revolving speed ωd of the damper case is equal to the revolving speed ωg of the inertia governor.
Figure 6:
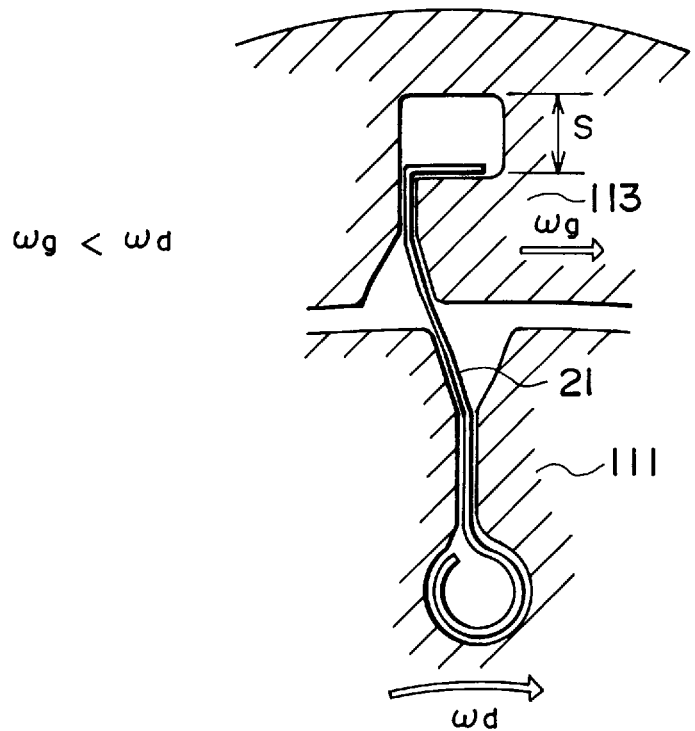
FIG. 6 is a diagram illustrating the form of the leaf spring when the revolving speed ωd of the damper case is higher than the revolving speed ωg of the inertia governor.
Figure 7:
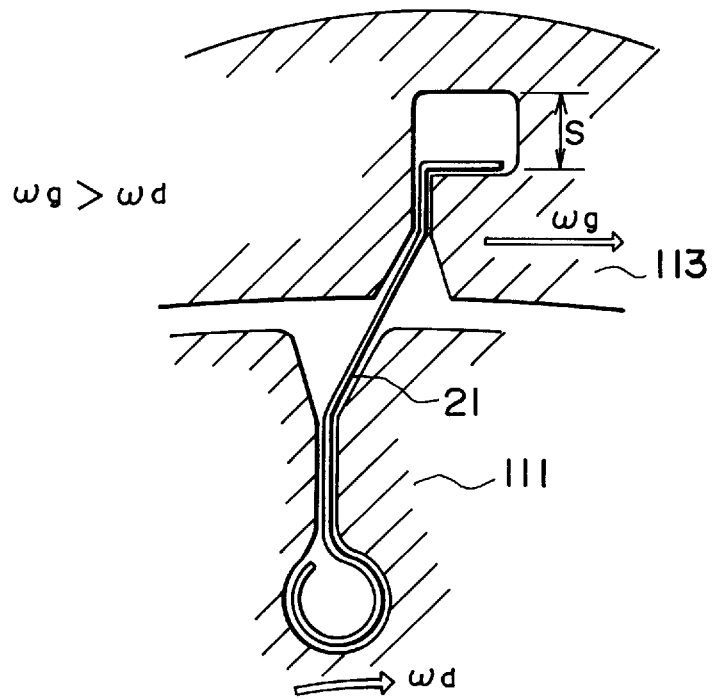
FIG. 7 is a diagram illustrating the form of the leaf spring when the revolving speed ωd of the damper case is lower than the revolving speed ωg of the inertia governor.

The following describes the action of the leaf spring 21 in the above-mentioned construction with reference to FIGS. 5, 6, and 7.

Figure 12:
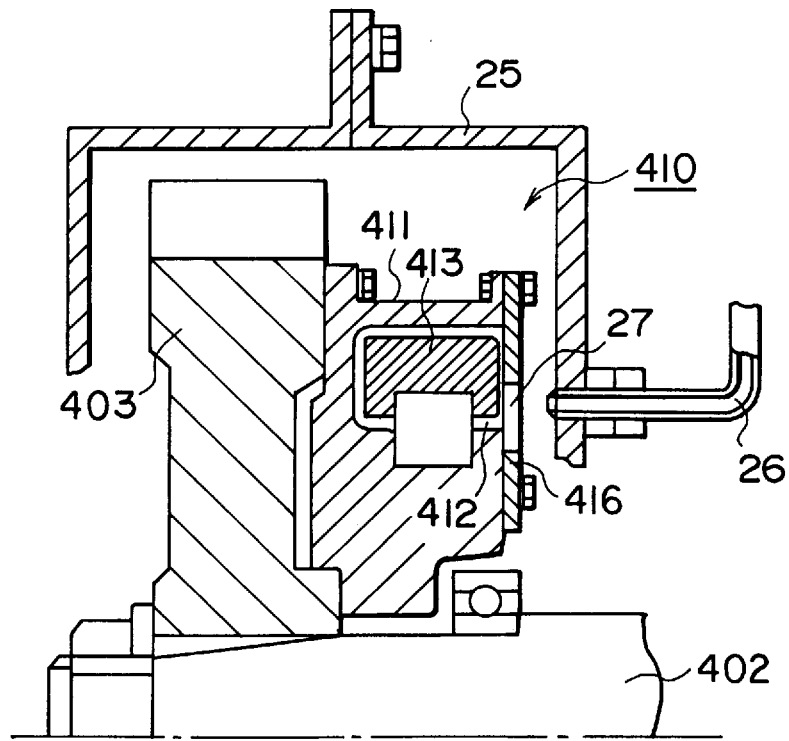
FIG. 12 is a partial side cross section, illustrating details of an alternative cooling device for the first embodiment of the invention.

FIG. 5 shows that the revolving speed ωd of the rotary shaft 2 fixed with the gear 3 for transmitting a fluctuating driving torque, namely the revolving speed ωd The following describes details of an alternate cooling device, which can be employed with the first embodiment of the invention, with reference to FIG. 12, which is a cross section similar to the upper half of FIG. 1.

In this embodiment, a cooling liquid is supplied not from the rotary shaft 2, but directly from a case 25. To be more specific, the case 25, covering the damping device 410, is connected to a pipe 26 ended in a nozzle, through which the cooling liquid is supplied from a pump, not shown, into the case 25. The cooling liquid is directly supplied into the inertia governor chamber 412 through a supply hole 27, which is provided in the lid 416 of the damper case 411, providing a cooling effect greater than that of the other embodiment. The other operations are the same as those described with reference to FIGS. 1 and 2 and are identified with corresponding reference characters increased by 400; hence, the descriptions of these operations will be skipped.

Figure 13:
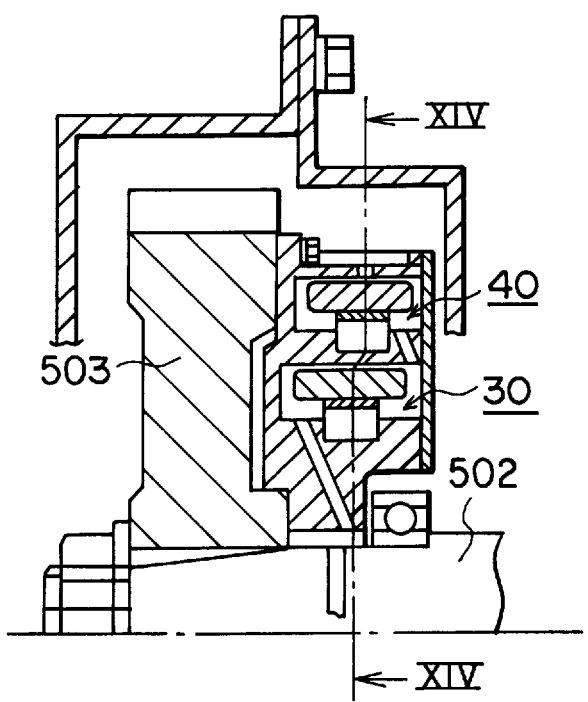
FIG. 13 is a side cross section, along line XIII—XIII of FIG. 14, illustrating a plurality of damping devices practiced as a second embodiment of the invention.
Figure 14:
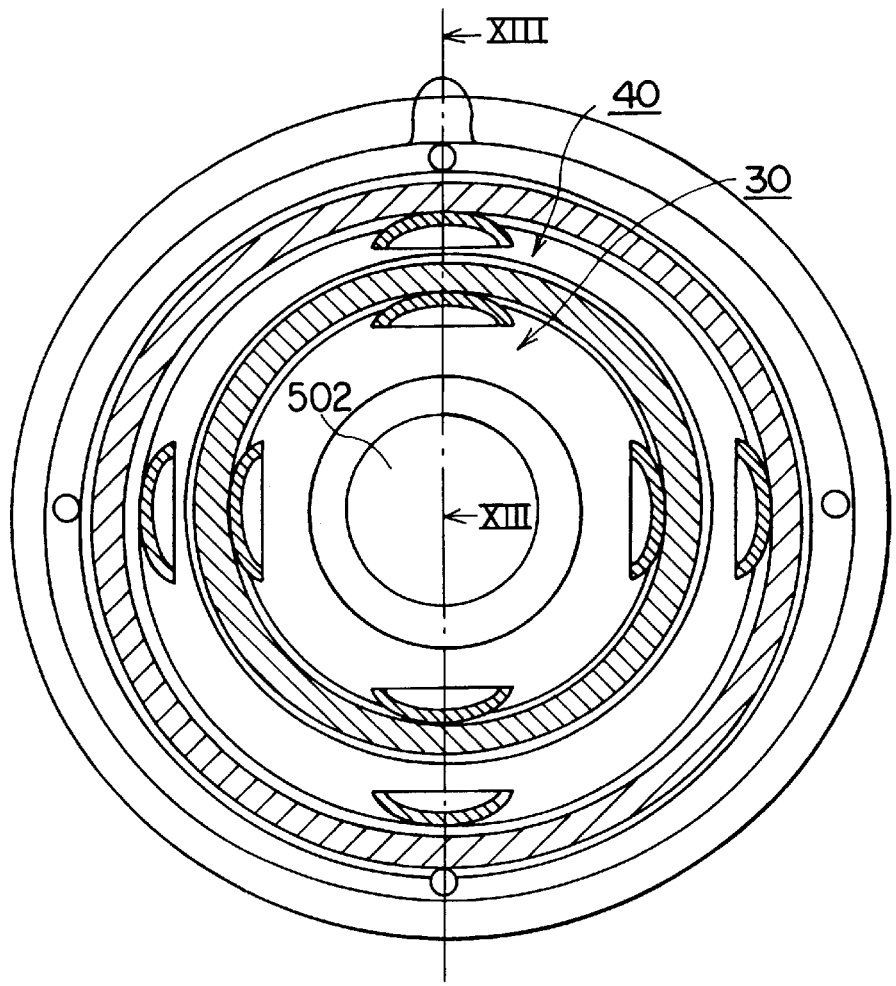
FIG. 14 is a front cross section, along line XIV—XIV of FIG. 13, illustrating the damping device practiced as the second embodiment of the invention.
Figure 15:
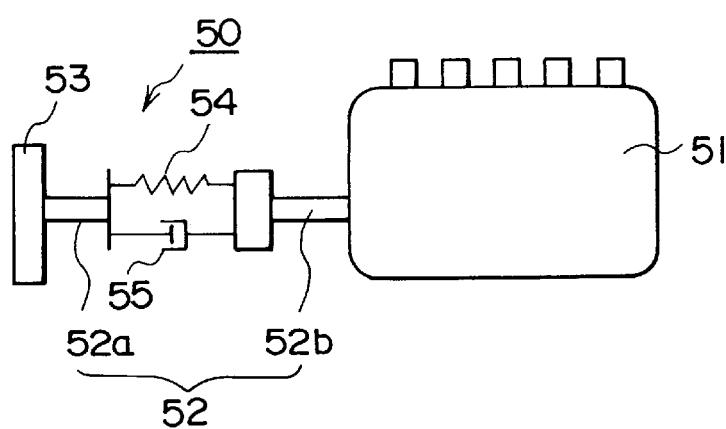
FIG. 15 is a diagram illustrating a prior-art device having a conventional damper coupling.

The following describes a plurality of damping devices 30 and 40, which are utilized together in a second embodiment of the invention, with reference to FIGS. 13 and 14.

In this second embodiment, two damping devices 30 and 40 are arranged adjacent to each other in the radial direction of the rotary shaft 502. The rotational fluctuations and torsional vibrations of the rotary shaft 502 are first reduced in fluctuating frequency by the first damping device 30 as a primary damping. Next, the fluctuating frequency, reduced by the primary damping, is further reduced by the second damping device 40 as a secondary damping. The rotary shaft 502 and the gear 503 correspond to the rotary shaft 2 and the gear 3 of FIG. 1. Since the constructions of the damping devices 30 and 40 are the same as that of the damping device 10, the descriptions of the constructions of the damping devices 30 and 40 will be skipped.

As described and according to the present invention, the damping devices 10, 30, and 40 are attached to the gear 3 (or gear 403 or gear 503). This novel construction shortens the damping devices, resulting in a smaller external form. Further, the damping devices 10, 30, and 40 can be attached to a gear, finding application also in the gearing device of a transmission, for example. Still further, the leaf spring 14 or the inertia governor 13 is made of steel, thereby enhancing the durability of the damping devices 10, 30, and 40 as compared with a conventional damping device using a spring or an inertia governor made of rubber or the like.

Moreover, the pad 15 (or 315) is merely inserted into the pad groove between the inertia governor 13 and the damper case 11, thereby making the damping device structure simple and high-precision machining unnecessary, lowering the fabrication cost. In addition, the damping devices 10, 30, and 40 are liquid-cooled, minimizing the generation of frictional heat.

INDUSTRIAL APPLICABILITY

The present invention is applicable to a device for damping the rotational fluctuations and torsional vibrations and reducing the noise of a rotary shaft in an engine or a transmission having a gear subjected to rotational fluctuations and torsional vibrations.

That which is claimed is:

1. Apparatus comprising:

a bearing;

a rotary shaft supported by said bearing, said rotary shaft having a longitudinal axis;

a gear attached to said rotary shaft; and at least one damper device for damping rotational fluctuations and torsional vibrations of said gear, each said damping device comprising:

a damper case, said damper case being attached to said gear, said damper case having a ring-shaped space, said ring-shaped space having an inner diameter side and a plurality of grooves formed in said inner diameter side generally parallel to said longitudinal axis of said rotary shaft;

an inertia governor, accommodated in said ring-shaped space, said inertia governor having an inner periphery side with a plurality of grooves formed in said inner periphery side generally parallel to said longitudinal axis of said rotary shaft;

at least one of said inner diameter side of said ring-shaped space and said inner periphery side of said inertia governor having a plurality of pad grooves formed therein;

a plurality of leaf springs, each of said leaf springs having a first end and a second end, each first end of the respective leaf spring being in a respective one of said plurality of grooves formed in said inner diameter side of said ring-shaped space and each second end of the respective leaf spring being in a respective one of said plurality of grooves formed in said inner periphery side of said inertia governor; and a plurality of pads, each of said pads having a generally arch shaped cross section, each of said pads being positioned between the inner periphery side of said inertia governor and an outer periphery of said damper case, each of said plurality of pads having first and second ends with the first and second ends of each respective pad being positioned in a respective one of said pad grooves, so that each of said pads abuts said inertia governor and said damper case when said gear and said rotary shaft rotate to thereby apply a damping force to said inertia governor.

2. Apparatus in accordance with claim 1, wherein each of said plurality of grooves formed in said inner diameter side of said ring-shaped space includes a tapered section adapted to abut the respective leaf spring when the respective leaf spring deforms.

3. Apparatus in accordance with claim 1, wherein each of said plurality of grooves formed in said inner periphery side of said inertia governor includes a tapered section adapted to abut the respective leaf spring when the respective leaf spring deforms.

4. Apparatus in accordance with claim 3, wherein each of said plurality of grooves formed in said inner diameter side of said ring-shaped space includes a tapered section adapted to abut the respective leaf spring when the respective leaf spring deforms.

5. Apparatus in accordance with claim 4, further comprising a device for providing a cooling liquid in said ring-shaped space.

6. Apparatus in accordance with claim 1, further comprising a device for providing a cooling liquid in said ring-shaped space.

7. Apparatus in accordance with claim 1, wherein said plurality of pad grooves are formed in said inner diameter side of said ring-shaped space.

8. Apparatus in accordance with claim 7, wherein each of said pad grooves comprises a bottom and two ends, with the two ends extending outwardly from said bottom and towards each other, with each of the two ends being generally parallel to said longitudinal axis of said rotary shaft.

9. Apparatus in accordance with claim 1, wherein each of said leaf springs is generally planar.

10. Apparatus in accordance with claim 1, wherein said plurality of grooves formed in said inner diameter side are equally spaced about said inner diameter side, and wherein said plurality of grooves formed in said inner periphery side are equally spaced about said inner periphery side.

11. Apparatus in accordance with claim 1, wherein there is a clearance between ends of each pad groove and the first and second ends of the pad positioned in the respective pad groove.

12. Apparatus in accordance with claim 1, wherein said plurality of pad grooves are formed in and equally spaced along said inner diameter side of said ring-shaped space, wherein each pad is positioned in a respective pad groove so as to be movable radially with respect to the longitudinal axis of said rotary shaft.

13. Apparatus in accordance with claim 12, further comprising a passageway in said damper case for supplying pressurized cooling liquid to an inner side of each pad to increase force of contact of each pad with said inner periphery side of said inertia governor.

14. Apparatus in accordance with claim 1, wherein said at least one damper device includes a plurality of damper devices.

15. Apparatus in accordance with claim 14, wherein said plurality of damper devices are arranged in a radial direction with respect to the longitudinal axis of said rotary shaft.

16. Apparatus in accordance with claim 1, wherein each of said leaf springs has a bent end section and a curved end section, wherein each of said plurality of grooves formed in said inner diameter side includes a generally curved section for receiving the curved end section of a leaf spring, and wherein each of said plurality of grooves formed in said inner periphery side includes a generally rectangular section for receiving the bent end section of a leaf spring.

17. Apparatus in accordance with claim 16, wherein each of said plurality of grooves formed in said inner periphery side of said inertia governor includes an outwardly opening tapered section, and wherein each of said plurality of grooves formed in said inner diameter side of said ring-shaped space includes an outwardly opening tapered section.

18. Apparatus in accordance with claim 17, wherein each of said plurality of grooves formed in said inner periphery side of said inertia governor includes a generally parallel section between the generally rectangular section and the outwardly opening tapered section thereof, and wherein each of said plurality of grooves formed in said inner diameter side of said ring-shaped space includes a generally parallel section between the generally curved section and the outwardly opening tapered section thereof.

19. Apparatus in accordance with claim 18, wherein each of said generally curved sections is a generally cylindrical section.

20. Apparatus in accordance with claim 19, wherein said plurality of pad grooves are formed in and equally spaced along said inner diameter side of said ring-shaped space, wherein each pad is positioned in a respective pad groove so as to be movable radially with respect to the longitudinal axis of said rotary shaft.

* * * * *